United States Patent [19]

Roberts, deceased et al.

[11] Patent Number: 4,990,127
[45] Date of Patent: Feb. 5, 1991

[54] DUAL RANGE INFINITELY VARIABLE TRANSMISSION

[75] Inventors: Richard W. Roberts, deceased, late of Lombard, by R. Hopley Roberts, executor; Richard L. Smirl, Arlington Heights; Herbert N. Underwood, Chicago, all of Ill.

[73] Assignee: Borg-Warner Automotive, Inc., Sterling Heights, Mich.

[21] Appl. No.: 422,626

[22] Filed: Oct. 17, 1989

[51] Int. Cl.$^5$ ............................................. F16H 37/08
[52] U.S. Cl. ................................... 475/211; 475/212; 475/210
[58] Field of Search ........................ 475/210, 211, 212; 192/352

[56] References Cited

U.S. PATENT DOCUMENTS

| | | |
|---|---|---|
| 2,711,656 | 6/1955 | Smirl . |
| 2,933,952 | 4/1960 | Schou ................................. 475/211 |
| 4,458,318 | 7/1984 | Smit et al. . |
| 4,553,450 | 11/1985 | Gizard ............................... 475/212 |
| 4,630,504 | 12/1986 | Smirl . |
| 4,706,518 | 11/1987 | Moroto et al. ..................... 475/210 |
| 4,776,421 | 10/1988 | Kashihara ........................... 192/352 |
| 4,792,012 | 12/1988 | Morisawa et al. .................. 192/352 |
| 4,919,007 | 4/1990 | Aberson et al. .................... 475/210 |

FOREIGN PATENT DOCUMENTS

| | | | |
|---|---|---|---|
| 1351103 | 12/1963 | France ................................ 475/211 |
| 0473170 | 1/1954 | Italy ................................... 475/211 |

OTHER PUBLICATIONS

Chrysler Corporation AGT—102 Paper dated Nov. 12, 1980.

Primary Examiner—Rodney H. Bonck
Assistant Examiner—Ryan Massey
Attorney, Agent, or Firm—Neuman, Williams, Anderson & Olson

[57] ABSTRACT

A dual range infinitely variable transmission utilizes a continuously variable speed mechanism in conjunction with a fixed ratio speed mechanism to provide two power paths from the input to the rotatable output. A jaw clutch is utilized to switch between the high range and low range of the transmission. A reaction type clutch is utilized to provide a positive neutral for the transmission.

16 Claims, 6 Drawing Sheets

DUAL RANGE INFINITELY VARIABLE TRANSMISSION

BACKGROUND OF THE INVENTION

1. Field of the Invention

The present invention relates to a dual range infinitely variable transmission and, more particularly, to an infinitely variable transmission which includes two power paths to a pair of planetary gearsets. The transmission utilizes a continuously variable speed mechanism in conjunction with a fixed ratio speed mechanism for the two power paths. A two-position jaw clutch means is utilized to switch between the single path high range and the dual path low range of the transmission. A reaction type clutch is utilized to lock the sun gear of the second planetary gear set to provide a positive neutral.

2. Description of the Prior Art

The typical automotive transmission is shifted in specific, discrete steps between a high-torque, low-speed mode for vehicle launch and a high-speed, low-torque mode for vehicle operation at highway speeds. In a manual transmission, shifting is accomplished by the engagement of gear sets. In an automatic transmission, shifting is accomplished by the controlled engagement of friction elements. As a result of the limitations of shifting in discrete steps, the most efficient vehicle operation can only be approximated. Automotive engineers have long recognized that efficiency would be improved if the transmission could be adjusted continuously between ratios in order to compensate for changing conditions. Such continuous adjustment would allow engine operation to approach maximum efficiency for any particular condition.

Continuously variable transmissions, or CVT's, are directed to such increases in efficiency. The typical CVT employs a continuously variable speed mechanism in the form of a variable pulley with a pair of flanges mounted on an input shaft such that at least one of the flanges is movable axially with respect to the other. A similar variable pulley is mounted on an output shaft. A flexible belt couples the pulleys to allow the transfer of torque between the shafts when one of the shafts is driven. When the pitch radius of one pulley is changed, the pitch radius of the other pulley is changed simultaneously in the opposite direction. As a result, the drive ratio between the input and output shafts is varied in a continuous, smooth manner within the ratio range of the speed mechanism.

Heretofore, efforts have been made to extend the range of the transmission drive ratio of the CVT beyond the ratio range of the variable speed mechanism, that is, to devise an infinitely variable transmission. One such effort utilized two power paths between the torque input source and the rotating output. One power path comprised the conventional variable speed mechanism described above with variable pulleys on the input and output shafts and a belt connecting the pulleys. The second power path comprised a pair of sprockets, one located on each of the input and output shafts, and a silent chain drivingly connecting the two sprockets. The silent chain drive provided a fixed ratio drive.

In this prior art infinitely variable transmission, a sun portion of a planetary gear mechanism was driven by the output shaft of the variable speed mechanism. A planetary carrier portion of the same planetary gear mechanism was driven by the output sprocket of the fixed ratio chain drive. The transmission output speed in the dual drive mode was increased by changing the belt ratio to decrease the sun gear speed. The direct drive mode utilized only the variable speed mechanism as the fixed ratio chain drive became free wheeling.

An inherent weakness in such a prior art transmission which used more than a single clutch is that, during shifting, both clutches may be simultaneously engaged or simultaneously disengaged. A potentially dangerous situation is encountered during such simultaneous engagement or disengagement.

There has therefore been a need for an infinitely variable transmission with dual power paths which utilizes a clutch mechanism to actuate the dual drive and the direct drive. Moreover, there is a need for an infinitely variable transmission which reduces the number of components utilized in the gear reduction system and yet provides the necessary gear reduction for the output. There is also a need for a control system for such an infinitely variable transmission which allows precise control of the shifting between power paths and the componentry.

The infinitely variable transmission of the present invention provides such a structure and control system.

OBJECTS OF THE INVENTION

It is an object of this invention to provide an improved infinitely variable transmission, and particularly to provide a transmission which meets the aforenoted needs.

It is a specific object of this invention to provide an improved infinitely variable transmission which allows selective driving connection from input to output of a continuously variable speed mechanism in conjunction with a fixed ratio speed mechanism through a planetary gearset.

It is another object of this invention to provide an improved infinitely variable transmission which provides mutually exclusive selection through a two-position clutch of driving with dual power paths from input to output or driving with a single power path.

It is another object of this invention to provide an improved infinitely variable transmission with more than a geared neutral in the drive path to prevent vehicle movement when the neutral selection is made.

Other objects, advantages and features of the present invention will become apparent upon reading the following detailed description and appended claims, and upon reference to the accompanying drawings.

SUMMARY OF THE INVENTION

In accordance with one embodiment of this invention, an infinitely variable transmission apparatus is provided to couple a torque input source to a torque output. The transmission includes rotatable input and output shafts, as well as a rotatable intermediate shaft. First and second planetary gearsets are provided with each gearset having a first portion or planetary carrier portion, a second portion or sun portion and a third portion or ring portion.

Dual power paths are provided within the transmission. A first path allows selective driving coupling at a predetermined, fixed ratio of the input shaft with the carrier portion of the first planetary gearset. One power path includes a plurality of sprocket members and a power transmission chain, or silent chain, coupling the sprocket members. A first sprocket is positioned around the input shaft while a second sprocket is positioned around the carrier portion of the first planetary gearset. Alternately, an idler gear assembly, or the like, can be utilized to provide a fixed ratio drive in the first power path.

A jaw clutch means is slidingly connected around the first carrier to allow driving coupling of the carrier with the output sprocket of the silent chain constituting the first path, or, alternatively, locked coupling of the carrier to the ring portion of the first planetary gearset, thus decoupling the first path. The jaw clutch, with a detent ring, provides a spring-actuated toggle device with two distinct equilibrium positions. The equilibrium positions are mutually exclusive, that is, it is impossible for the clutch to be in both equilibrium positions simultaneously.

The other power path allows a second driving coupling of the input shaft with the intermediate shaft. This second power path includes an continuously variable speed mechanism having a first variable pitch pulley rotatable with the input shaft, a second variable pitch pulley rotatable with the intermediate shaft, and a belt coupling the pulleys. The intermediate shaft is drivingly coupled to the sun portion of the first planetary gearset. Unlike the first power path, the second power path cannot be disconnected by the control means.

The second planetary gearset of the transmission is located adjacent the first planetary gearset in the power path. The ring portion of the second planetary gearset is also the ring portion of the first planetary gearset. The carrier portion of the second planetary gearset is operatively coupled to the rotatable output shaft of the transmission.

A multiple plate clutch, or reaction type clutch, is connected to the sun portion of the second planetary gearset. The multiple plate clutch is operative to selectively ground the sun portion. In addition to overload protection and true neutral capabilities, the reaction type clutch includes the capability to slip at prescribed and controlled torque levels. The clutch acts to provide 100% slip, with a drag sufficient to eliminate backlash when the vehicle is stationary, and limits circulating power in the transmission to prevent belt or chain tensile overload.

BRIEF DESCRIPTION OF THE DRAWINGS

For a more complete understanding of this invention, one should refer to the preferred embodiment illustrated in greater detail in the accompanying drawings and described below by way of an example of the invention. In the drawings.

DETAILED DESCRIPTION OF THE DRAWINGS

Figure 1:
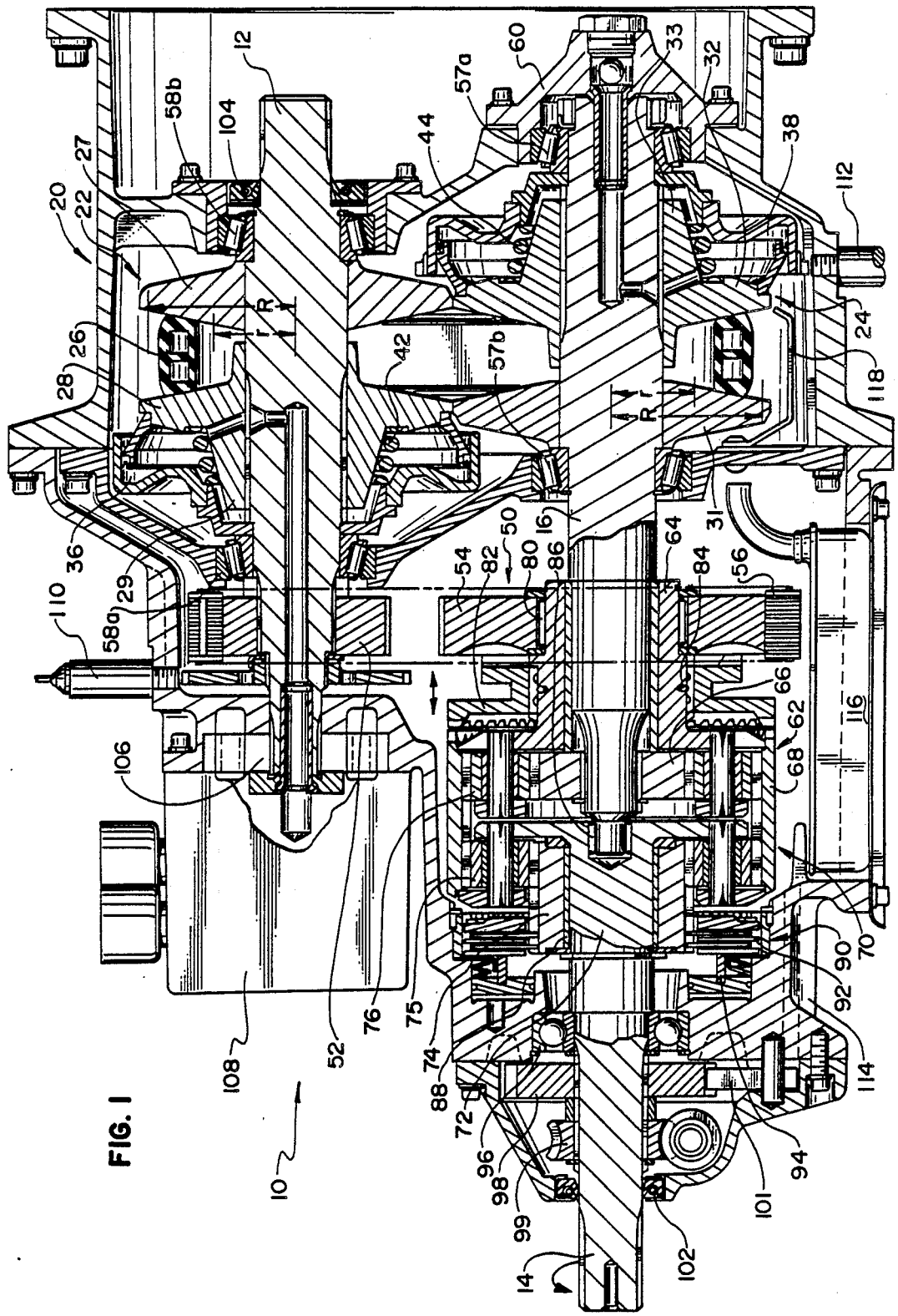
FIG. 1 is a longitudinal sectional view of the infinitely variable transmission employing the teachings of the present invention and illustrating the locations of the internal components.
Figure 2:
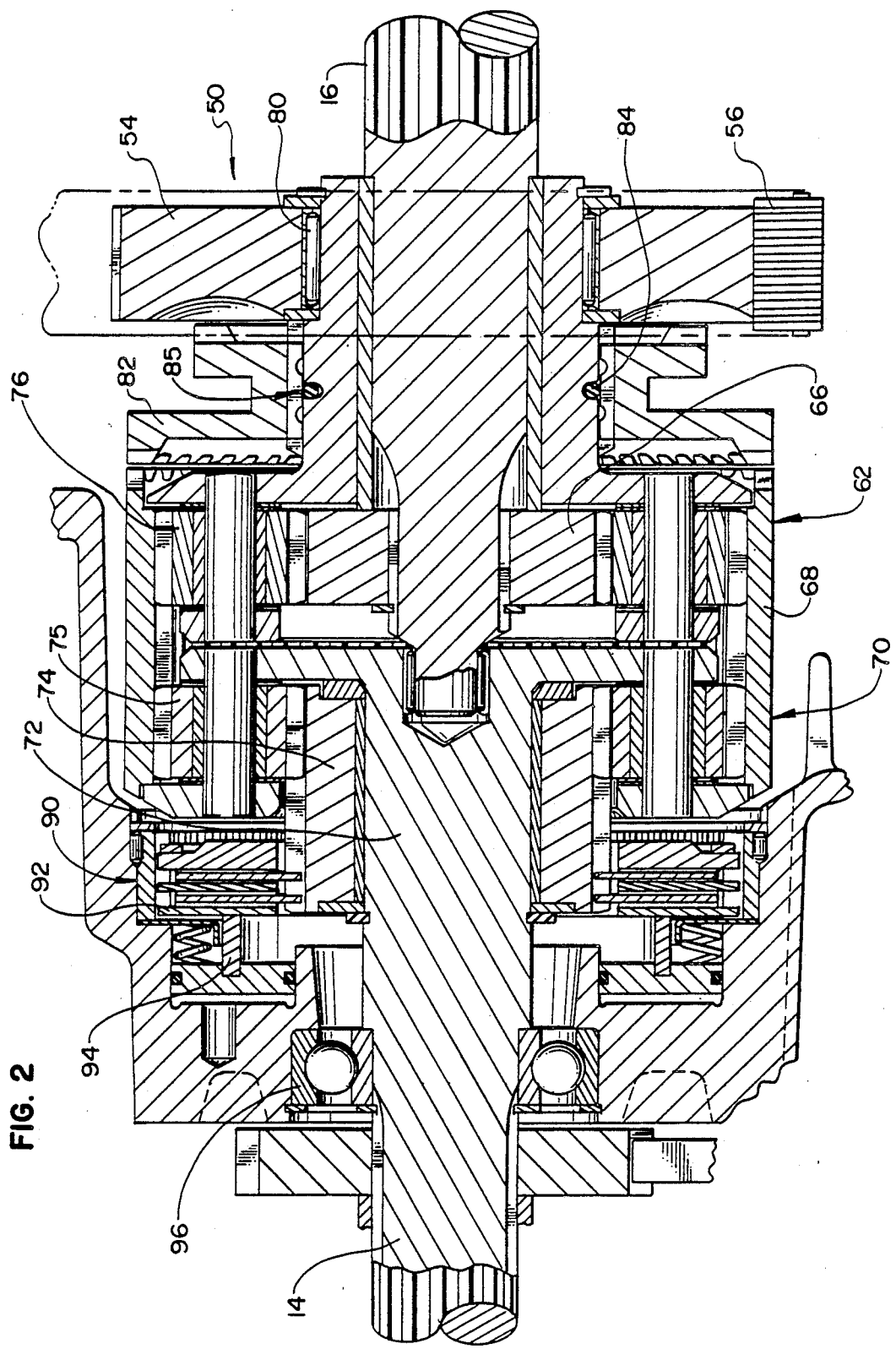
FIG. 2 is a detailed view of a portion of FIG. 1.
Figure 3:
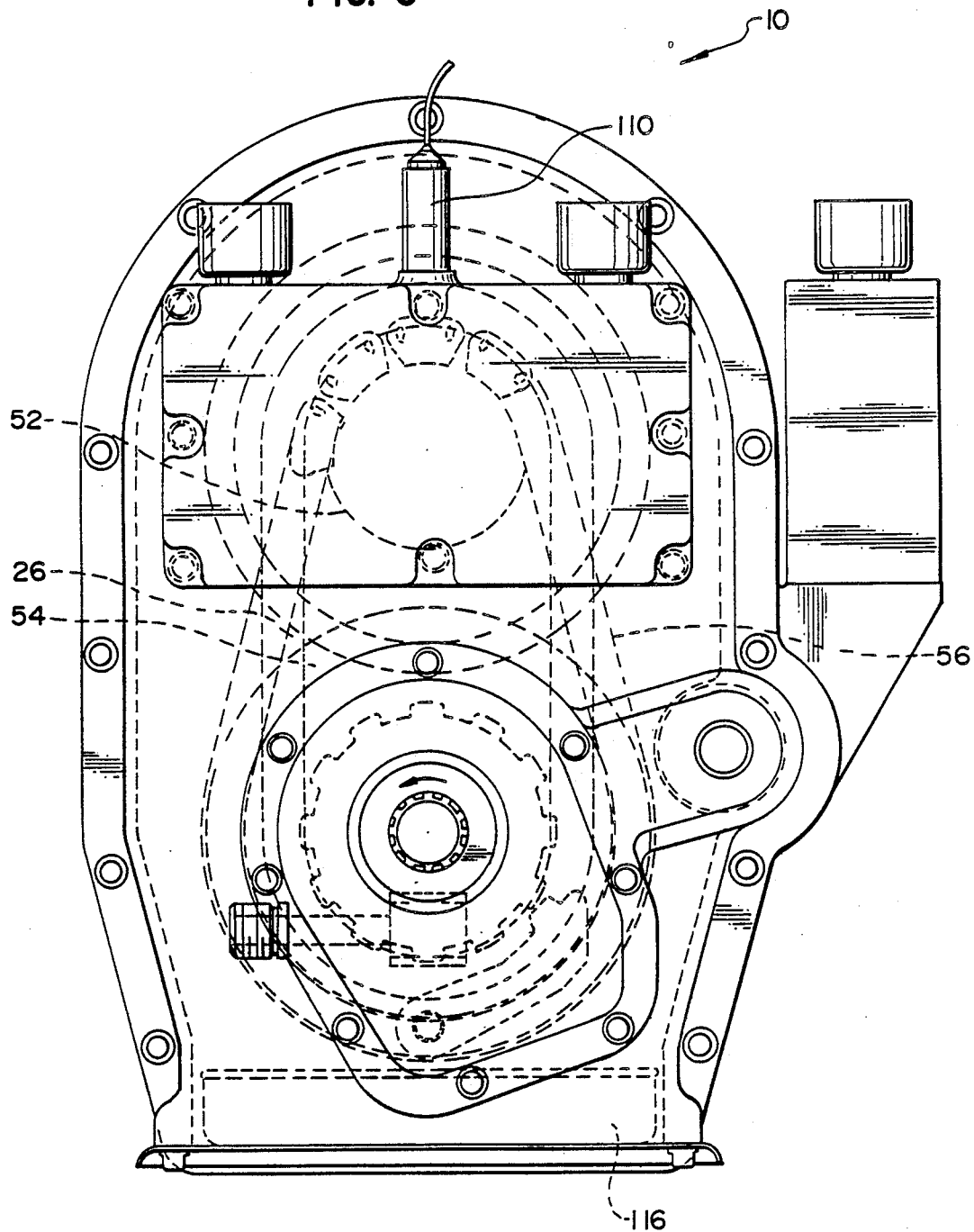
FIG. 3 is an end view of the transmission of FIG. 1, illustrating the locations of the internal components.

Turning now to the drawings, FIG. 1 shows an infinitely variable transmission generally at 10. A more detailed view of a portion of the transmission is shown in FIG. 2 and an end view of the transmission is shown in FIG. 3. The transmission includes an input shaft 12, which is capable of receiving a torque input from a power source, such as an engine, and an output shaft 14, which is capable of transmitting a torque output to a drive line or the like. An intermediate shaft 16 is located beneath the input shaft 12 and parallel thereto. The intermediate shaft 16 is preferably positioned directly in a line with the output shaft 14.

Two power paths are provided to transmit torque from the input shaft 12 to an output. One power path comprises a continuously variable speed mechanism, shown generally at 20, which transmits torque from the input shaft 12 to the intermediate shaft 16. The continuously variable speed mechanism preferably includes a first variable pulley 22 on the input shaft 12 and a second variable pulley 24 on the intermediate shaft 16. Each pulley is continuously variable between a maximum pitch radius R and a minimum pitch radius r. The ratio of R/r is predetermined to exceed the ratio of the other power path by a few percent. A suitable belt 26 or the like couples pulleys 22 and 24. Examples of suitable belts are disclosed in U.S. Pat. No. 4,313,730, issued Feb. 2, 1982, and U.S. Pat. No. 4,507,106, issued Mar. 26, 1985. A wide variety of belts, such as Van Doorne belts, may be used in a continuously variable speed mechanism of this type. Other suitable belts may use either flexible or articulated tensile members that provide suitable resistance to elongation combined with transverse members that provide good resistance to lateral compression with a low ratio of weight to tensile strength.

Pulley 22 includes a fixed flange 27 and a slidable flange 28 having a hub 29 rotatable with and slidable relative to the shaft 12. The hub 29 may be splined along the shaft. As the slidable flange 28 moves from its distal position to its proximal position relative to the fixed flange 27, the pulley 22 moves from its minimum pitch radius r to its maximum pitch radius R.

Pulley 24 is similar to pulley 22, and may be formed from virtually identical parts. Pulley 24 includes a fixed flange 31 rotatable with shaft 16 and a slidable flange 32 having a hub 33 rotatable with and slidable relative to shaft 16. As the slidable flange 32 moves from its distal position to its proximal position relative to the fixed flange 31, the pulley 24 moves from its minimum pitch radius r to its maximum pitch radius R.

When flange 28 is in its distal position and flange 32 is in its proximal position, the torque ratio through the continuously variable speed mechanism 20, from shaft 12 to shaft 16, is R/r. When the flange 28 is in its proximal position and flange 32 is in its distal position, the torque ratio through the continuously variable speed mechanism 20, from shaft 12 to shaft 16, is r/R.

Suitable means is provided for directing fluid to and from chambers 36 and 38 in order to slide flanges 28 and 32, respectively, and thus to vary the pitch radii of pulleys 22 and 24 between their predetermined minimum and maximum limits. Springs 42 and 44 help direct the sliding movement of the slidable flanges 28 and 32.

The other power path from the input to an output includes a fixed ratio drive, shown generally at 50, which transmits torque from the input shaft 12. The fixed ratio drive 50 includes a first sprocket 52 and a second sprocket 54. The sprockets 52 and 54 are drivingly connected by a chain 56, which is preferably of the silent chain type. Examples of suitable silent chain include U.S. Pat. No. 4,342,560, issued Aug. 3, 1982, and U.S. Pat. No. 4,010,656, issued Mar. 8, 1977. A wide variety of chain may be used in a fixed ratio speed device of this type, including roller chain as well as silent chain. Alternatively, an idler gear assembly may be utilized to provide a fixed ratio drive.

The intermediate shaft 16 is supported by a pair of tapered roller bearings 57a, 57b, within the transmission housing 60. Similarly, the input shaft 12 is supported by a pair of tapered roller bearings 58a, 58b.

At the second end of the intermediate shaft 16 is a first planetary gearset or differential planetary, shown generally at 62. The first planetary gearset 62 has a first portion or planetary carrier portion 64, a second portion or sun portion 66, and a third portion or ring portion 68. In the preferred embodiment, the sun portion has 36 teeth while the ring portion has 66 teeth. A second planetary gearset 70, or speed reduction planetary, is provided adjacent the first planetary gearset 62. The second planetary gearset 70 likewise has a first portion or planetary carrier portion 72, a second portion or sun portion 74, and a third portion or ring portion 68. The ring portion of the second planetary gearset 70 is preferably formed of the ring portion of the first planetary set 62, and is therefore given an identical number 68. Each planetary gearset contains the conventional reaction members and gearing teeth, including the planet gears 75, 76.

The first planetary gearset 62 is supported by the intermediate shaft 16. The second planetary gearset 70 is supported by output shaft 14.

The first sprocket 52 of the fixed ratio drive has t teeth and is secured to the input shaft 12. The first sprocket, in the preferred embodiment, has 26 teeth. The second sprocket 54, with T teeth, is connected about the periphery of the planetary carrier portion 64 of the first planetary gearset 62. The second sprocket is supported by the planetary carrier 64 by bearing 80, or the like, which allows the sprocket 54 to freewheel around the planetary carrier portion 64. The second sprocket 54, in the preferred embodiment, has 47 teeth.

A jaw clutch 82, or dog clutch, is slidably connected by a spline about the hub of the planetary carrier 64, between the second sprocket 54 and the ring portion 68. A detent ring 84, disposed between the clutch 82 and the planetary carrier 64, causes the clutch to be in a position engaging the ring portion 68 or in a position engaging the sprocket 54. The length of the dog clutch member 82 is slightly less than the space between sprocket 54 and ring gear 68 to avoid any overlap in engagement. The shape of the detent grooves 85 in the hub of member 82 is designed to bias this member away from its mid-position into one of the two engagement positions. By shifting the jaw clutch between these positions, either the sprocket 54 is drivingly connected to the planetary carrier 64 or the ring portion 68 is locked or connected to the planetary carrier 64. Alternatively, two friction clutches may be used to provide engagement.

The detent means 85, with the detent ring 84, provides a spring-actuated toggle device with two distinct equilibrium positions. The equilibrium positions are mutually exclusive and the neutral position will be unstable, that is, the jaw clutch 82 will not be in both positions simultaneously.

The sun portion 74 of the second planetary gearset 70, which has 38 teeth in its preferred form, is disposed about the periphery of the planetary carrier portion 72, or output shaft. A bearing 86 allows rotation of the shaft 16 within the planetary carrier 72. A bearing 88 is interposed between the sun 74 and the planetary carrier 72 to allow rotation of the sun about the planetary carrier. The sun portion 74 is operatively connected to a second clutch 90 of the disc plate type. Alternatively, other means such as a band and drum can be used for the same purpose. The clutch 90 includes plates 92 and an actuation member 94. The clutch 90 allows a grounding of the sun 74 to the transmission housing 60. Actuation of the clutch through member 94 locks the plates 92 and thereby locks the sun 74 to the housing 60. When the clutch 90 is disengaged, the sun 74 is allowed to spin freely.

The output shaft 14 is supported by bearing 86 and ball bearing 96, which are located adjacent the parking gear 98 and the speedo gear 99. The parking gear 98 locks the output shaft when connected to hinged pawl 101. The speedo gear is a conventional pickup for a speedometer. A fluid seal 102 is provided at the output shaft 14. A similar fluid seal 104 is provided at the input shaft 12. The input shaft 12 is supported by a pair of bearings 58a, 58b. A fluid pump 106 is provided along the input shaft, near the location of the first sprocket 52. The fluid pump 106 provides the necessary hydraulic pressure for the control system.

The transmission housing 60 includes a number of components which assist the actuation of the transmission. A control housing 108 is located at the end of the input shaft 12. The control system will be described in more detail below. A pair of speed sensors 110, 112 are provided and operatively connected to the input shaft 12 and the intermediate shaft 16, respectively. The lower portion of the housing 60 includes a fluid drain passage 114 and filter 116, as well as a windage tray 118. Additional structural support for the transmission and control components is also provided.

Figure 4:
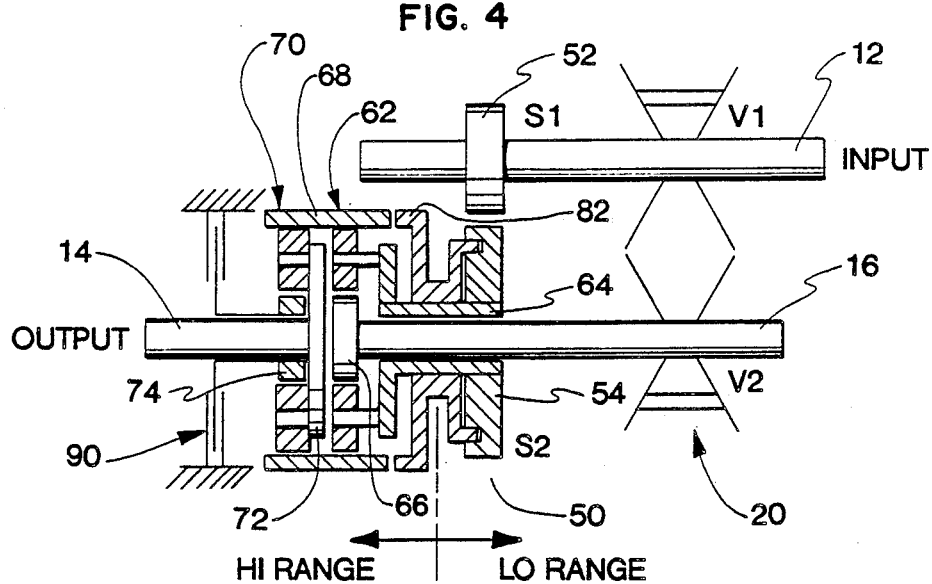
FIG. 4 is a schematic of the infinitely variable transmission illustrating the two power paths and the pair of planetary gearsets.
Figure 5:
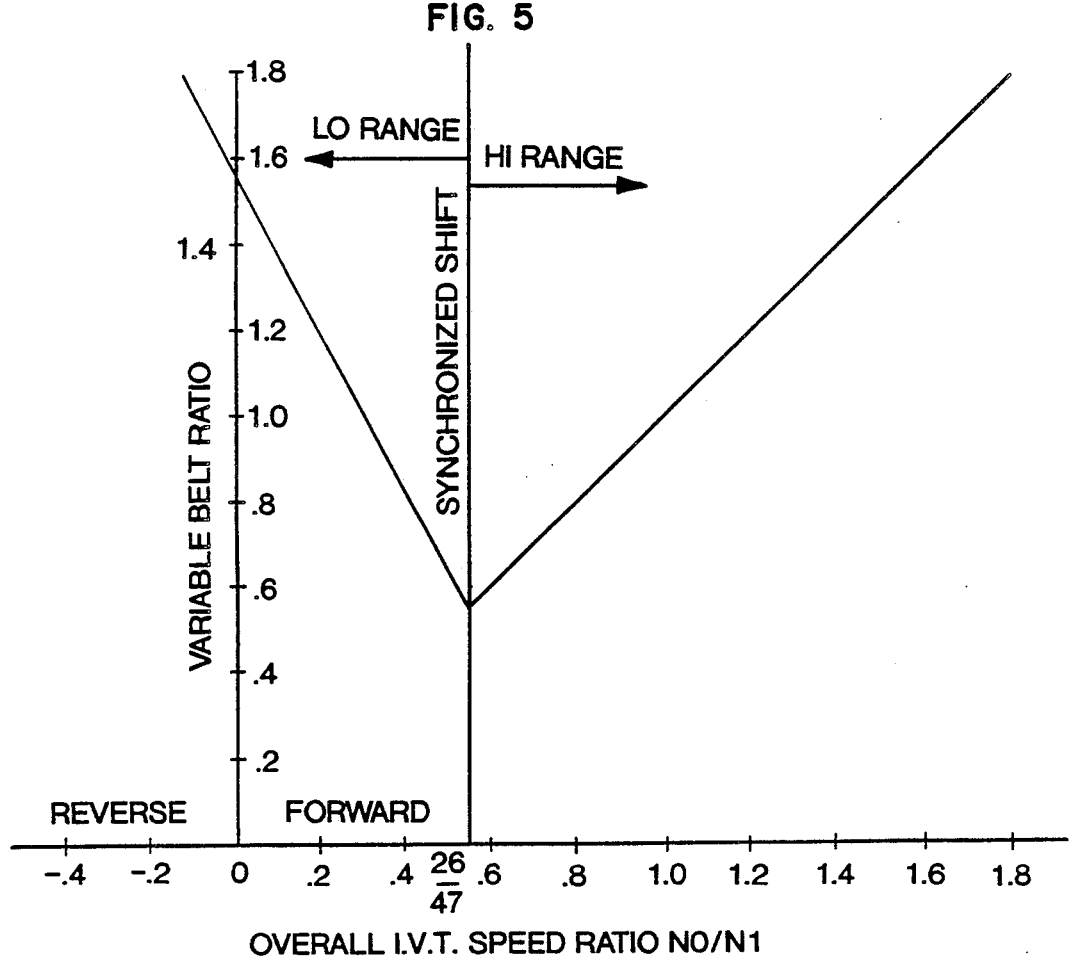
FIG. 5 is a graph of the relationship of the overall I.V.T. speed ratio plotted against the variable belt ratio.

A schematic of the operation of the infinitely variable transmission is shown in FIG. 4. The relationship between the variable belt speed ratio and the overall transmission ratio is shown in FIG. 5. As shown in FIG. 4, the first planetary gearset 62, or differential planetary gearset, has the ring gear 68 connected to the output. The planet carrier 64 is always driven in the same direction as the input shaft 12; in low range, by means of fixed ratio drive 50; in high range, by means of the lock to the ring gear 68. The sun 66 is driven in the same direction as the input shaft by the continuously variable speed mechanism 20. The relative speeds of the sun 66 and carrier 64 in low range can result in the ring 68 turning in the opposite direction of input shaft 12, resulting in reverse gear.

In the preferred embodiment, at the forward speed ratio of 0.55, or 26/47, all elements in the first planetary gearset 62, that is, the sun 66, the planet carrier 64 and the ring 68, are rotating at the same speed and the jaw clutch 82 may be shifted from the low range to the high range, and vice versa. The shift to the high range is achieved by disconnecting the planet carrier 64 from the second sprocket 54 in the fixed ratio drive 50 and connecting the planet carrier 64 to the ring 68. This action locks the planet carrier 64 to the ring 68 and, at the same time, removes the fixed ratio chain drive 50 from the power flow. In the high range, the transmission operates as a straight, continuously variable transmission with speed ratios from 0.55 to 1.81.

As shown in FIG. 5, starting in forward and reverse is accomplished in the preferred embodiment simply by changing the belt ratio below and above 1.57 while the transmission is in the low range, that is, while the jaw clutch 82 is connected to the fixed ratio drive 50. No separate slipping of a clutch is required to move from reverse to forward.

In the preferred embodiment, the final reduction ratio is 6.49. The final reduction is achieved by a 1.58 reduction at the second planetary gearset 70, or reduction planetary gearset, and a 4.11 rear axle ratio (not shown), which can be accomplished by a differential mechanism. As shown in FIG. 4, the reduction planetary gearset shares the ring gear 68 with the ring gear of the differential planetary. The planet carrier 72 is connected to, or forms a part of output shaft 14. The sun gear 74 is connected to ground, or the transmission housing 60, by the multiple plate clutch 90.

As shown in FIG. 5, in the preferred embodiment, when the variable belt ratio is 1.57 and the transmission is in the low range, the ring gear 68 of the differential planetary stops rotating and the vehicle is stationary. All of the power from the input shaft circulates between the fixed ratio drive 50 and the continuously variable speed mechanism 20, and there is zero output power. With slight discrepancies in the belt speed ratio above and below 1.57, the vehicle can creep forward or backward. This creep is slow, but very powerful and limited only by wheel slip. To prevent this vehicle creep, a positive disconnect is provided in the form of the multiple plate or disc clutch 90. When the control lever is in the neutral position, the clutch 90 is fully released and the sun 74 spins freely.

The clutch 90 serves another important purpose as an overload protection device In addition to overload protection and true neutral capabilities, the clutch 90 includes the capabilities to slip at predescribed and controlled torque levels. The clutch acts to slip and thus provide a small amount of torque near neutral (to eliminate backlash) and limits circulating power in the transmission to prevent belt or chain tensile overload.

To operate the transmission in the low range, the jaw clutch 82 is shifted to the right, as shown in FIGS. 1, 2 and 4, which connects the sprocket 54 of the fixed ratio drive 50 to the planetary carrier 64 of the first planetary gearset 62. In this mode of operation, the power flows through two paths. The first path is through the fixed ratio drive 50 and then the planetary carrier 64. The second path is through the continuously variable speed mechanism 20 and then through the sun 66. In the preferred embodiment, the transmission operates in the low range between a 0.55 speed ratio (forward) and a 0.13 speed ratio (reverse), with split power as a result of the first differential planetary gearset. At variable belt ratios between 1.57 and 1.81, the transmission operates in reverse with overall transmission speed ratios from 0 to 0.13. At variable belt ratios from 1.57 to 0.55, the transmission operates in forward with overall transmission speed ratios from 0 to 0.55.

Figure 6:
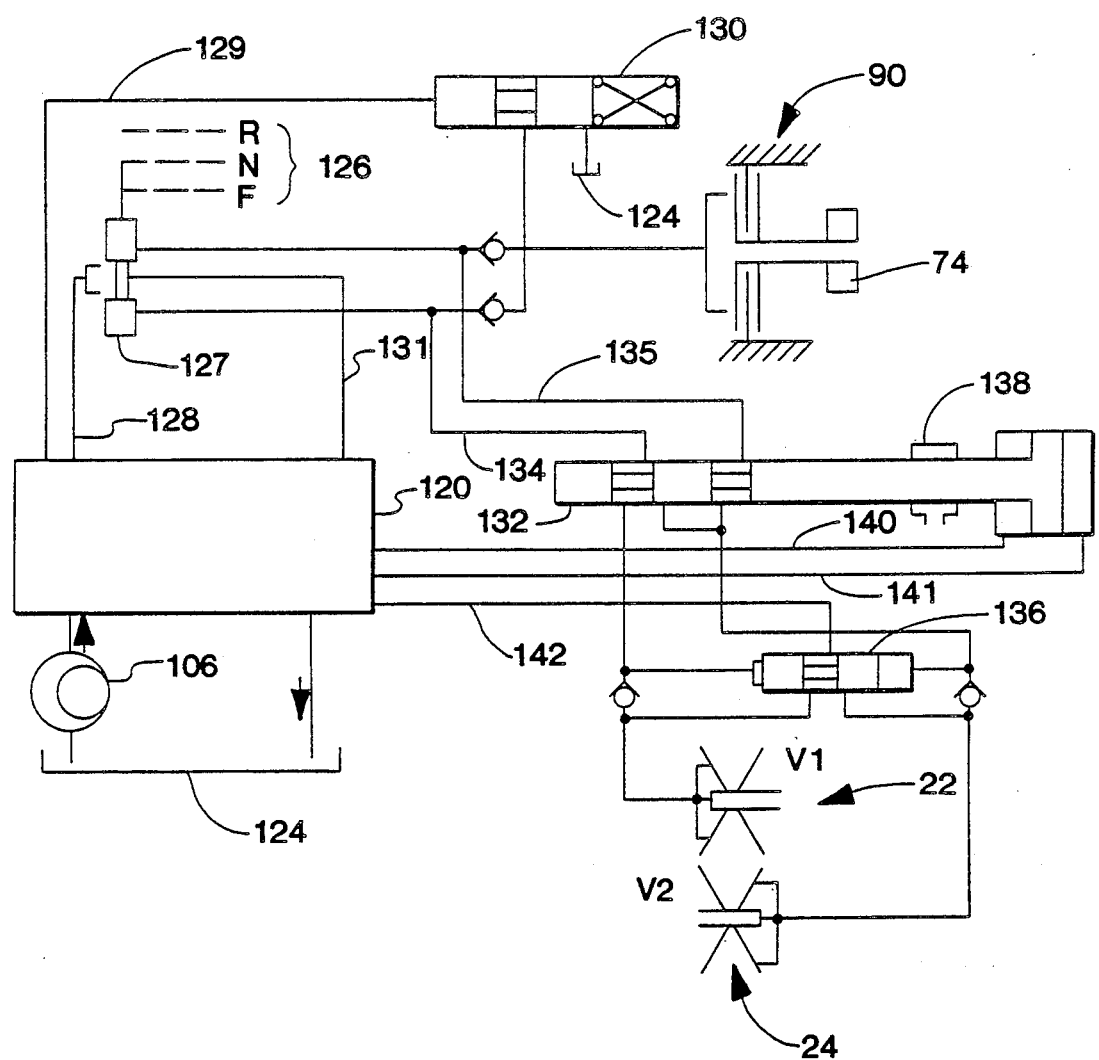
FIG. 6 is a schematic of the control system for the infinitely variable transmission; and, FIG. 7 is a piping diagram for the control system.
Figure 7:
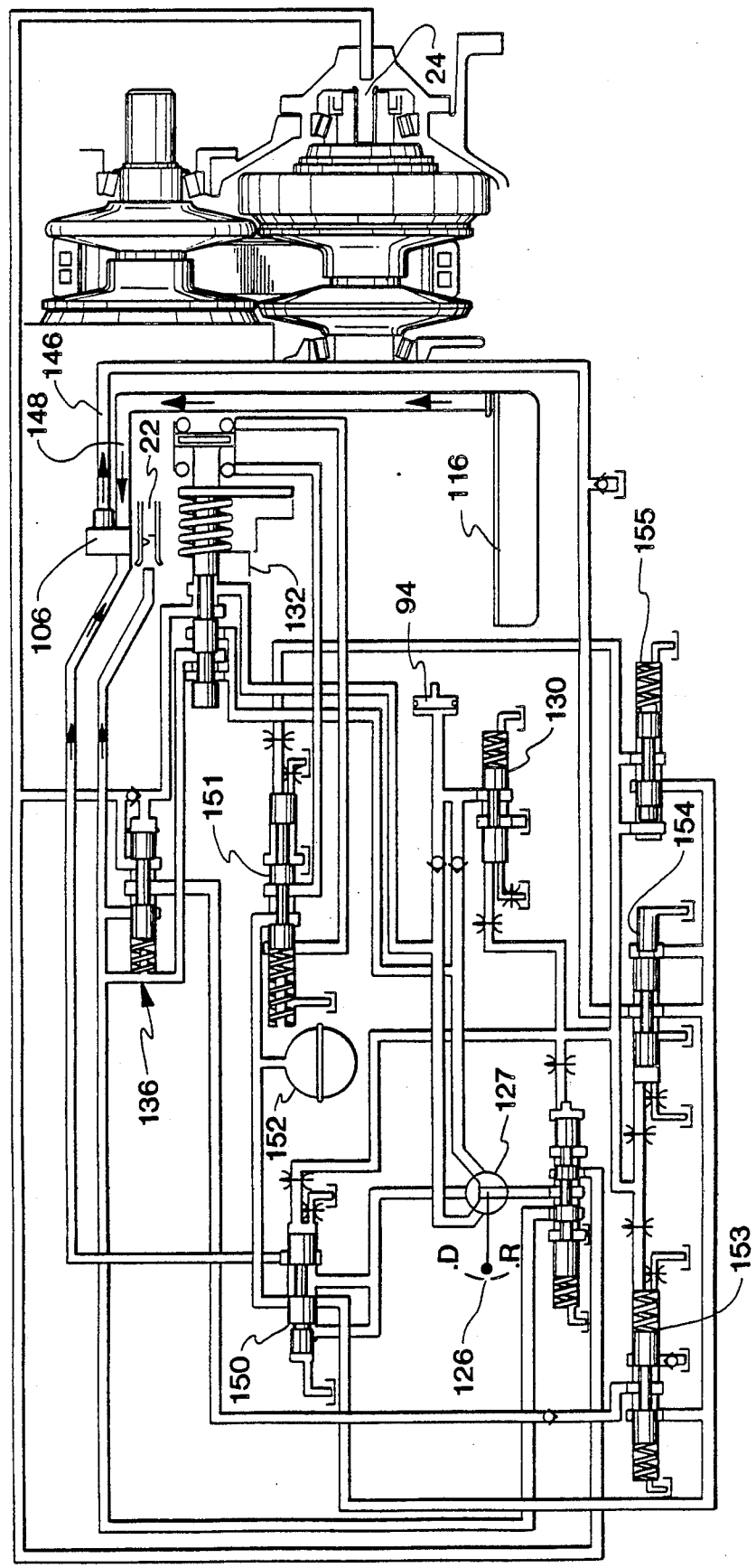

In the low range operation, the driver selects forward "D" or reverse "R", from the selector shown on the control schematics of FIGS. 6 and 7. Movement from the neutral position causes the clutch 90 to be lightly applied to allow a small amount of torque to be delivered to the drive train to take up the gear backlash, but not enough to move the vehicle. This avoids vehicle creep and provides a smooth vehicle launch upon accelerator actuation without a driveline clunk due to backlash. The variable belt is then moved slightly away from the zero output (1.57 ratio) to a slightly forward or slightly reverse ratio. The small ratio along with the lightly applied clutch is necessary to takeup backlash in the driveline. At this point, vehicle operation continues with the selector in the "D" position for any forward driving situation. The controls and accelerator position will select engine r.p.m. and the transmission ratio for the desired operation of the vehicle.

To operate the transmission in the high range, a synchronous shift is made at the forward speed ratio of 0.55, at which all elements of the first planetary gearset are rotating at the same speed, by sliding the jaw clutch 82 to the left, as shown in FIGS. 1, 2 and 4. This movement releases the driving connection between the sprocket 54 and the planet carrier 64 and locks the planet carrier 64 to the ring gear 68. The fixed ratio drive 50 and the first planetary gearset 62 are now inoperative and the total power flow is through the continuously variable speed mechanism. The overall transmission speed ratio is therefore equal to the variable belt ratio and is continuously variable from 0.55 to 1.81 in the high range.

The control system schematic is shown in FIG. 6, while the control piping diagram is shown in FIG. 7. The control of the transmission involves control of the torque or load pressure to the pulleys of the continuously variable speed mechanism 20, in order to ensure that the belt 26 will not slip. The control of the transmission also involves control of the flow into or out of the ratio control chambers 36, 38 in order to select the most optimum ratio relative to the engine performance economy map supplied by the designer of the particular engine chosen for use with the transmission.

Each of the variable pulleys 22 and 24 is utilized as either the driver pulley or the driven pulley depending on the following transmission conditions. In the high range, which allows only forward motion, the pulley 22 is the driver pulley on the input shaft 12, and the pulley 24 is the driven pulley on the intermediate shaft 16. Overall speed ratios range between 0.55 and 1.81 in this mode. In the low range, during forward motion, pulley 24 on the intermediate shaft is the driver pulley and pulley 22 on the input shaft is the driven pulley. Overall speed ratios range between 0.55 and 1.57 in this mode. In the low range, during reverse motion, pulley 22 on the input shaft is the driver pulley and pulley 24 on the intermediate shaft is the driven pulley. Overall speed ratios range between 1.57 and 1.81 in this mode.

In that the pulleys change their function depending on the mode of transmission operation, the control system acts to supply torque pressure to the driven pulley and ratio fluid control to the driver pulley on the basis of this schedule of driver/driven pulleys. The complete control system is configured to generate the proper ratio flow and torque pressure relative to the engine economy and performance map, which is dependent on the engine chosen for use with the infinitely variable transmission.

As shown in the schematic of FIG. 6, an electronic/-hydraulic control box 120 provides several outputs on the basis of electronic signal inputs. The control box 120 receives signal information of input (engine) speed, output (vehicle) speed, accelerator position and selector control position (forward, reverse, neutral, park). The control box also receives information of the speed of the input, intermediate and output shafts. The electronic control calculates whether to increase or decrease the ratio fluid control and torque pressure control and sends the appropriate signals to the variable pulleys 22 and 24 to achieve the optimum points on the engine performance and economy map, which is based on the chosen engine. The electronic/hydraulic control box 120 also sets the variable belt ratio at 1.57, to reduce hysteresis and eliminate hunting, when the selector lever 126 is in the neutral position. The electronic/hydraulic control box 120 further sends the appropriate signals to effectuate a range upshift or a range downshift.

A pump 106 supplies fluid from sump 124 to send the regulated torque pressure to the selector valve 127. The selector lever 126 is operatively connected to the selector valve 127 which controls the regulated torque pressure by line 128. When the selector lever 126 is in neutral, the multiple plate clutch 90, or neutral and overload clutch, is disengaged and the sun 74 on the planetary reduction rotates freely. The clutch control signal is sent through line 129 to the clutch control valve 130. The electronic/hydraulic control box 120 sends a signal to maintain the variable pulley ratio at 1.57 through line 131.

The forward signal is sent to a range valve 132 through line 134. The reverse signal is sent to the range valve 132 through line 135. When the control lever 126 is placed in either forward or reverse, the neutral/overload clutch is lightly engaged and the regulated torque pressure is routed through the range valve 132 to the variable pulleys 22 and 24, which are designated in the schematic as V1 and V2, respectively. During the passage to the variable pulleys 22, 24, the torque pressure directs a diverter valve 136 into the proper position so that the ratio control fluid is directed to the opposite pulley of the torque pressure fluid.

When the vehicle is accelerating in the forward direction and the overall speed ratio reaches 0.55, a range fork 138 moves to the left putting the transmission in the high range. This directs the torque pressure fluid to the second pulley 24 and the ratio control fluid to the first pulley 22. The low range signal and high range signal are sent from the electronic/hydraulic control box 120 by lines 140 and 141, respectively. The pulley ratio signal is sent from the electronic/hydraulic control box 120 by way of line 142.

The piping diagram of FIG. 7 shows the preferred embodiment of the implementation of the control system. The diagram shows the selector valve 127 operatively connected to the clutch control valve 130. Both the selector valve 127 and clutch control valve 130 are operatively connected to the clutch apply piston 94. The selector valve 127 is also piped to a range valve 132 and a diverter valve 136. Each of these valves is preferably in the form of a conventional spool valve. The selector valve 127 is also piped to a secondary pressure valve 150, which is connected to a range pilot valve 151 with an accumulator 152 therebetween. The secondary pressure valve 150 and diverter 136 are each piped to a ratio flow valve 153, which is piped to a pump pressure valve 154 and a pilot pressure valve 155. Pressure for flow is provided by pump 106, which includes pressure line 146 and suction line 148. Through this control system, fluid is supplied to variable pulley 22, or V1, and variable pulley 24, or V2.

The valves of the control system are in the following positions for each the described transmission conditions:

| Valve Name | Reverse | Forward-Low | Neutral | Forward-High |
| --- | --- | --- | --- | --- |
| Rotary Selector | L | R | M | R |
| Ratio Neutral | R | R | C | R |
| Clutch Control | C | C | L | C |
| Diverter | L | R | M | L |
| Range Pilot | R | R | R | L |
| Range | R | R | R | L |
| Pump Pressure | C | C | C | C |
| Pilot Pressure | C | C | C | C |
| Secondary Press. | C | C | C | C |
| Ratio Flow | C | C | N | C |

The designations in the table are detailed as follows:
L—left or counter-clockwise
R—right or clockwise
M—middle
C—control variable
N—not applicable The infinitely variable transmission, including the control system, can be matched with engines of varying sizes and performance characteristics. The preferred embodiment of this transmission was developed for use with a single-shaft, ceramic, gas-turbine powered passenger car, with a reduction gear. The infinitely variable transmission of the present invention is capable of operating continuously at input speeds in the 4500 to 6000 r.p.m. range necessary to utilize the best characteristics of a single shaft turbine engine having a fixed ratio output gear speed reduction.

While one preferred embodiment of the invention is illustrated, it will be understood, of course, that the invention is not limited to this embodiment. Those skilled in the art to which the invention pertains may make modifications and other embodiments employing the principles of this invention, particularly upon considering the foregoing teachings.

What is claimed is:

1. An infinitely variable transmission apparatus to couple a torque input source to a torque output, comprising:
   rotatable input and output shafts;
   a rotatable intermediate shaft;
   first planetary gearset means having a first planetary portion, a second planetary portion and a third planetary portion;
   first drive means for selectively drivingly coupling said input shaft with said first planetary portion, said first drive means including jaw clutch means operatively disposed to allow said selective driving coupling,
   second drive means for drivingly coupling said input shaft with said intermediate shaft, said second drive means being a continuously variable speed mechanism engaging said input shaft and said intermediate shaft;
   said intermediate shaft being drivingly coupled to said second planetary portion;
   said jaw clutch means being operatively disposed for selective locking of said first planetary portion with said third planetary portion; and,
   said third planetary portion being operatively coupled to said output shaft.

2. An infinitely variable transmission apparatus to couple a torque input source to a torque output, comprising:
- rotatable input and output shafts;
- a rotatable intermediate shaft;
- first planetary gearset means having a first planetary portion, a second planetary portion and a third planetary portion;
- first drive means for selectively drivingly coupling said input shaft with said first planetary portion, said first drive means including jaw clutch means operatively disposed to allow said selective driving coupling,
- second drive means for drivingly coupling said input shaft with said intermediate shaft, said second drive means being a continuously variable speed mechanism engaging said input shaft and said intermediate shaft;
- said intermediate shaft being drivingly coupled to said second planetary portion;
- said jaw clutch means being operatively disposed for selective locking of said first planetary portion with said third planetary portion;
- second planetary gearset means having a carrier portion, a sun portion, and a ring portion,
- said ring portion comprising said third planetary portion of said first planetary gearset means; and
- said carrier portion being operatively coupled to said output shaft.

3. The infinitely variable transmission apparatus of claim 2 having disc clutch means operatively connected to said sun portion, said disc clutch means being operative to selectively ground said sun portion.

4. An infinitely variable transmission apparatus to couple a torque input source to a torque output, comprising:
- rotatable input and output shafts;
- a rotatable intermediate shaft;
- first planetary gearset means having a first planetary portion, a second planetary portion and a third planetary portion;
- first drive means for selectively drivingly coupling said input shaft with said first planetary portion, said first drive means including first and second sprocket members and a power transmission chain coupling said sprocket members, said first drive means including a jaw clutch means operatively disposed about the periphery of said first planetary portion to allow said selective driving coupling,
- second drive means for drivingly coupling said input shaft with said intermediate shaft;
- said second drive means including a first variable pitch pulley rotatable with said input shaft, a second variable pitch pulley rotatable with said intermediate shaft, and a belt coupling said pulleys,
- each of said pulleys including a first fixed flange rotatable with its associated shaft and each of said pulleys including a second flange rotatable with and slidable relative to its associated shaft between proximal and distal positions relative to its associated fixed flange;
- said intermediate shaft being drivingly coupled to said second planetary portion;
- said jaw clutch means being slidingly disposed for locking engagement of said first planetary portion with said third planetary portion;
- second planetary gearset means having a carrier portion, a sun portion, and a ring portion,
- said ring portion being said third planetary portion of said first planetary gear means;
- said carrier portion being operatively coupled to said output shaft;
- disc clutch means operatively connected to said sun portion, said disc clutch means being operative to selectively ground said sun portion.

5. The infinitely variable transmission apparatus of claim 4 wherein said second sprocket member being operatively disposed around the periphery of said first planetary portion.

6. The infinitely variable transmission apparatus of claim 5 wherein said second sprocket member being disposed upon a bearing member allowing freewheeling of said second sprocket member around said first planetary portion.

7. The infinitely variable transmission apparatus of claim 4 wherein said jaw clutch means includes a clutch member disposed around the periphery of said first planetary portion.

8. An infinitely variable transmission apparatus to couple a rotating torque input source to a rotatable output, comprising:
- continuously variable ratio coupling means having an input shaft coupled to said torque input source and an intermediate shaft,
- said intermediate shaft being driven at a rate within a range between a rate less than the rate of said input shaft and a rate greater than the rate of said input shaft;
- first planetary gearset means having a sun portion, ring portion and a planet carrier portion;
- rotatable coupling means drivingly connected to each one of said planetary gearset means portions,
- said input shaft being selectively drivingly coupled to a first one of said rotatable coupling means which is in turn coupled to a first one of said planetary gearset means portions,
- said intermediate shaft being drivingly coupled to a second one of said rotatable coupling means for a second one of said planetary gearset means portions,
- said first rotatable coupling means being selectively coupled to a third one of said rotatable coupling means for a third one of said planetary gearset means portions,
- said first rotatable coupling means including jaw clutch means for effecting said rotatable coupling to said input shaft or to said third rotatable coupling means in the alternative;
- said third planetary gearset means portion being drivingly connected to said rotatable output, and
- control means responsive to the ratio of said continuously variable ratio coupling means for determining whether said first rotatable coupling means is coupled to said input shaft or through said third rotatable coupling means to said rotatable output.

9. The apparatus of claim 8 including input sensor means for sensing the rate of rotation of said input shaft and intermediate sensor means for sensing the rate of rotation of said intermediate shaft.

10. The apparatus of claim 9 wherein said control means compares the output of said input sensor means and said intermediate sensor means to generate a difference signal, said control means including means to shift said jaw clutch means from driving coupling with said third rotatable coupling means when said first and said second planetary gearset means portions are rotating at the same rate as indicated by said difference signal.

11. The apparatus of claim 10 wherein torque is transmitted from said torque input source to said third planetary gearset means portion by the dual paths of said first rotatable coupling means and said second rotatable coupling means for rates of rotation of said second rotatable coupling means greater than the rate of rotation of said first rotatable coupling means.

12. The apparatus of claim 11 including transmission means and second planetary gearset means having a sun portion, a ring portion and planet carrier portion, said third portion of said first planetary gearset means being drivingly coupled to said ring portion of said second planetary gearset means, said planet carrier portion of said second planetary gearset means being drivingly coupled to said rotatable output, said sun portion of said second planetary gearset means being selectively coupled to said transmission means, said second planetary gearset means providing a neutral gear whereby said rotating torque input source is decoupled from said rotatable output when said sun portion of said second planetary gearset means is decoupled from said transmission means.

13. The apparatus of claim 12 wherein said ring portion of said second planetary gearset means further comprises said third portion of said first planetary gearset means.

14. The apparatus of claim 12 including a disc clutch means for selectively coupling said sun portion of said planetary gearset means to said transmission means.

15. The apparatus of claim 14 wherein said disc clutch means further comprises a multiple plate clutch.

16. The apparatus of claim 12 including said continuously variable ratio coupling means having a first ratio range to allow movement of said rotatable output in a first direction and second ratio range to allow movement of said rotatable output in a second direction.

* * * * *